_(12)_ United States Patent
Hartman et al.

(10) Patent No.: US 7,243,783 B2
(45) Date of Patent: *Jul. 17, 2007

(54) CHAIN PIN FOR HINGE CONVEYOR CHAINS

(75) Inventors: Stephan David Hartman, 's Gravenzande (NL); Gijsbertus Johannes Verduijn, Terheijden (NL)

(73) Assignee: Rexnord Flat Top Europe B.V., GV's Gravenzande (NL)

( * ) Notice: Subject to any disclaimer, the term of this patent is extended or adjusted under 35 U.S.C. 154(b) by 0 days.

This patent is subject to a terminal disclaimer.

(21) Appl. No.: 11/483,456

(22) Filed: Jul. 10, 2006

(65) Prior Publication Data

US 2006/0249358 A1    Nov. 9, 2006

Related U.S. Application Data

(62) Division of application No. 10/841,106, filed on May 7, 2004, now Pat. No. 7,097,032.

(30) Foreign Application Priority Data

May 9, 2003    (NL)    ................................. 1023383

(51) Int. Cl.
    *B65G 17/06*    (2006.01)
(52) U.S. Cl. .................... 198/853; 198/851; 198/474
(58) Field of Classification Search ................ 198/850, 198/851, 853, 747
    See application file for complete search history.

(56) References Cited

U.S. PATENT DOCUMENTS

| | | | |
|---|---|---|---|
| 3,912,551 A | 10/1975 | Araya | |
| 4,601,795 A | 7/1986 | Smith et al. | |
| 4,711,676 A | 12/1987 | Kitaori et al. | |
| 5,121,831 A | 6/1992 | Fesler | |
| 5,131,960 A | 7/1992 | Kluge | |
| 5,226,791 A | 7/1993 | Miwa et al. | |
| 5,314,323 A | 5/1994 | Bolles | |
| 5,439,751 A | 8/1995 | Fesler | |
| 5,449,547 A * | 9/1995 | Miyazaki et al. | ............ 428/217 |
| 5,925,412 A | 7/1999 | Raghavan | |
| 6,315,455 B1 * | 11/2001 | Tanaka et al. | ............... 384/492 |
| 6,582,765 B2 | 6/2003 | Wang et al. | |
| 6,632,301 B2 | 10/2003 | Krauss et al. | |
| 6,680,129 B2 | 1/2004 | Wang et al. | |
| 6,855,214 B2 * | 2/2005 | Obara et al. | ................. 148/325 |
| 6,935,552 B2 | 8/2005 | Komai et al. | |
| 6,978,885 B1 | 12/2005 | Schumacher | |

FOREIGN PATENT DOCUMENTS

| | | |
|---|---|---|
| DE | 3105891 A1 | 9/1982 |
| GB | 1 543 864 | 4/1979 |
| GB | 2 051 859 A | 1/1981 |
| JP | 58 136750 | 8/1983 |
| WO | WO 2004/099041 A2 | 11/2004 |

OTHER PUBLICATIONS

Patent Abstracts Of Japan, vol. 007, No. 252 (C-194), Nov. 9, 1983 corresponding to JP 58 136750 A.

* cited by examiner

*Primary Examiner*—Joseph Dillion, Jr.
(74) *Attorney, Agent, or Firm*—Quarles & Brady LLP

(57) ABSTRACT

A method of assembling a hinge conveyor chain includes providing adjacent conveyor links formed from a ferritic-pearlitic stainless steel, wherein the adjacent links have interdigitating link ends with openings for receiving a pin, and inserting a pin having a radially outwardly facing surface formed from a steel alloy with more than 0.6 wt. % of carbon and more than 12 wt. % of Cr through the openings of the interdigitating link ends to pivotally link the adjacent links.

5 Claims, 1 Drawing Sheet

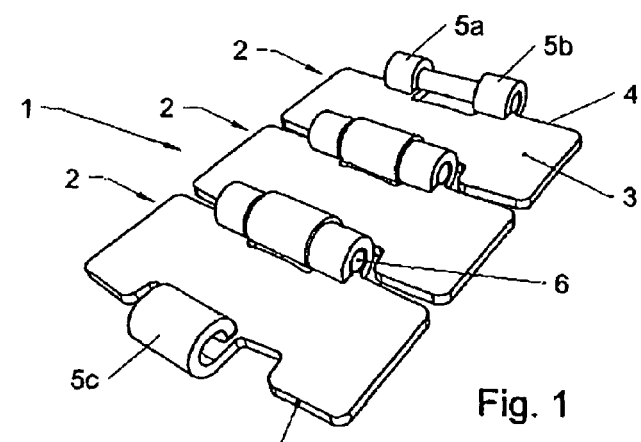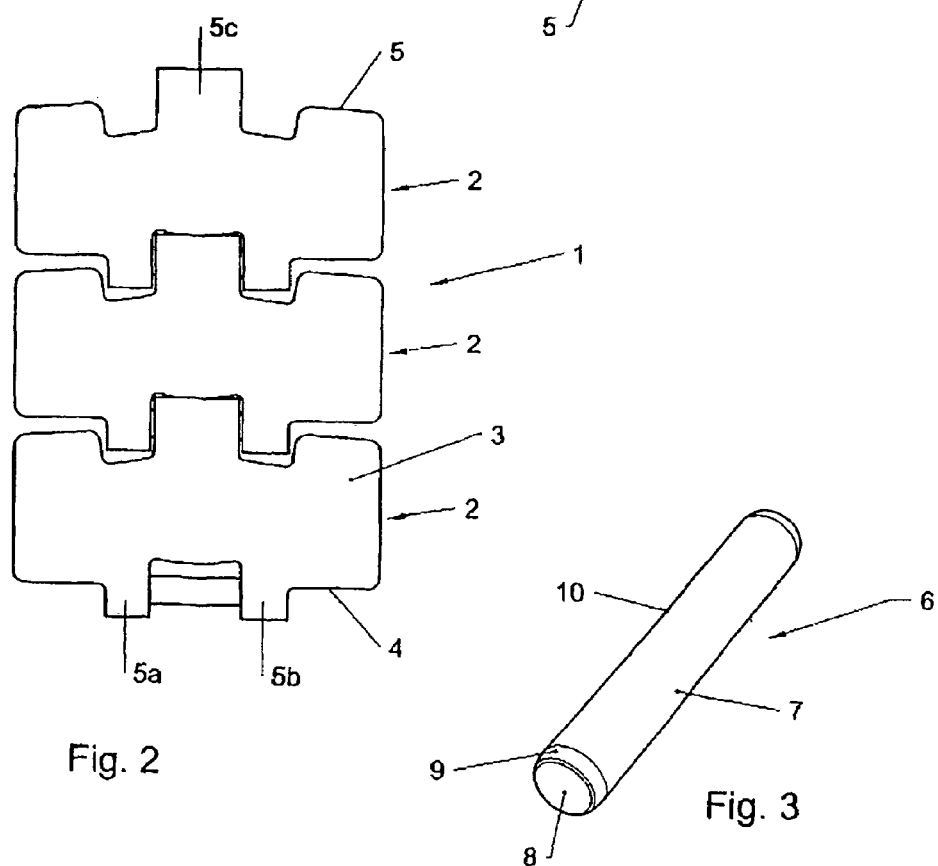

CHAIN PIN FOR HINGE CONVEYOR CHAINS

CROSS REFERENCES TO RELATED APPLICATIONS

This application is a divisional application of U.S. patent application Ser. No. 10/841,106 filed on May 7, 2004 now U.S. Pat. No. 7,097,032.

STATEMENT REGARDING FEDERALLY SPONSORED RESEARCH

Not Applicable.

BACKGROUND OF THE INVENTION

The invention relates to the use of steel alloys in chain pins for hinge conveyor chains, in particular to alloys of stainless steel for use in such chain pins in combination with chain links manufactured from stainless steel.

Stainless-steel hinge conveyor chains are usually deployed in industrial applications where, in mechanical terms, heavy demands are made on the conveyor chains. Thus, stainless-steel conveyor chains can be loaded considerably more heavily than conveyor chains from plastic. They also offer a good resistance to external influences, particularly to the action of dirt and/or (remains of) product to be conveyed, such as for instance to street dirt or other dirt coming from crates when crates are conveyed or to glass fragments (pieces or glass powder) when (reused) bottles are conveyed in, for instance, the beverage industry.

When objects are conveyed by means of conveyor chains, it is sometimes important that the objects can somewhat slide over the surface of the chain. This may be achieved in practice by deploying the stainless-steel conveyor chains either lubricated or unlubricated. The term lubricated is understood to mean that, during the conveyance, a layer of lubricant is applied, usually in the form of an aqueous solution of a (synthetic) lubricant, such as soap. In an unlubricated operation, the surface of the chain needs to be so smooth that a sufficiently low frictional resistance can already be achieved without lubricant.

With both lubricated and unlubricated hinge conveyor chain systems, in use, wear occurs with the passage of time. It has been found that this wear particularly affects the pins which connect the individual links of the chain with each other. Due to the wear of the pin, the conveyor chain will become longer, which inter alia results in skipping of the chain on the driving gear, so that the conveying function is lost. Also, the mutual play between the links which results from wear of the pins will generally lead to more failures in the conveyance, for instance in that, on a worn conveyor chain, products easily fall over or become damaged in another manner. It is even possible for the conveyor chain to break as a result of the wear. In this context, it is noted that the speeds at which the conveyor chains are driven can be very high. In particular if single-line mass transport is desired, for instance after a parallel product flow merges into a single serial flow (for instance in a filling apparatus for bottles), the speed of the single-line chains can increase considerably, to no less than 80 m/min or more.

In addition, high demands are made on the life span of the conveyor equipment. For some applications, a conveyor chain needs to be able to operate without failure for at least six years. For lower speeds, ten years is no exception.

SUMMARY OF THE INVENTION

The present invention uses special alloys of stainless steel for the manufacture of pins in stainless-steel hinge conveyor chains which obviate or at least reduce the above-mentioned drawbacks. In particular, an object of the invention is to provide chain modules (that is, combinations of link and pin) by means of which stainless-steel hinge conveyor chains can be manufactured, which conveyor chains show less wear in use than conventional stainless-steel hinge conveyor chains.

After extensive research, it has been found that the wear of the pins of conventional stainless-steel hinge conveyor chains in practical conditions is the result of abrasive wear, that is, wear caused by the action of solid particles, particularly dirt, such as sand, glass particles, etc. This inter alia appeared from the observed scratches in the circular direction and from the polished surface of the worn pins. An expert would conclude from this that the remedy for the excessive wear of the pins can be found in the choice of a type of steel with high hardness. This is usually achieved by choosing a type of steel with high vanadium and/or tungsten contents, in particular if anti-corrosive properties are also desired (although steel with an elevated carbon content may have an improved hardness, the anti-corrosive properties thereof are usually not good).

However, a drawback of types of steel with high vanadium and/or tungsten contents is that they are not or only difficultly available in the form of drawn wire, which is preferred from a practical point of view and in terms of costs. This makes types of steel with high vanadium and/or tungsten contents less suitable in practice.

It has been found that, under the specific load occurring with hinge conveyor chains in operation, so-called adhesive wear plays an important role. This means that the wear of the pins also occurs if other wear mechanisms are eliminated, for instance if operation does not take place under abrasive conditions. Adhesive wear is the result of the so-called seizing of the two metals. Therefore, the present invention relates to a hinge chain conveyor, comprising at least two links from ferritic-pearlitic stainless steel, which links are hingedly coupled by means of at least one stainless-steel chain pin, with the chain pin comprising, at least on its outer surface, a steel alloy with more than 0.6 wt. % of carbon and more than 12 wt. % of Cr.

Such a combination of types of steel is surprisingly not, or hardly, seizing and results, in a practical hinge conveyor arrangement, in a very slight wear, in particular in a very slight adhesive wear.

Because the link is manufactured from ferritic-pearlitic steel, it is magnetic, so that the chains can very suitably be deployed in conveyor tracks comprising guiding bend segments provided with magnets, in particular the conveyor tracks as described in EP-A-0 509 605.

Very suitable steel for making the links in the chains according to the invention is the steel with Werkstoffnummer (material number) 1.4589. This steel has the following composition (in wt. %, remainder iron):

| C | Si | Mn | P | S | Cr | Module Ni | Ti |
|---|----|----|---|---|----|-----------|----|
| ≦0.08 | ≦1 | ≦1 | ≦0.045 | ≦0.030 | 13.0–15.5 | 0.2–1.2 1.0–2.5 | 0.3–0.5 |

Another ferritic-pearlitic stainless steel which is suitable for manufacturing the links according to the invention is known from DE-A-31 05 891, which publication is fully incorporated herein by reference. This known steel has the following composition (in wt. %, remainder iron):

| C | Si | Mn | Cr | Mo | Ni | Ti |
|---|----|----|----|----|----|----|
| ≦0.1 | ≦1 | ≦1 | 13.0–15.8 | ≦1.5 | 0.8–3.0 | ≦0.6 | in which the sum of the chromium and molybdenum percentages is at least 14.3 wt. %.

One embodiment of steel with Werkstoffnummer 1.4589 typically has the following composition (in wt. %, remainder Fe):

| C | Si | Mn | P | S | Cr | Mo | Ni | Ti |
|---|----|----|----|----|----|----|----|----|
| 0.044 | 0.56 | 0.53 | 0.024 | 0.001 | 13.9 | 0.25 | 1.64 | 0.43 |

Other suitable types of steel for making the links in the chains according to the invention are ferritic-pearlitic types of steel with the Werkstoffnummer 1.4016 and 1.4017.

Steel with Werkstoffnummer 1.4016 (AISI 430; X6Cr17) has the following composition (in wt. %, remainder Fe):

| C | Si | Mn | P | S | Cr |
|---|----|----|----|----|----|
| ≦0.08 | ≦1 | ≦1 | ≦0.045 | ≦0.030 | 15.5–17.5 |

Steel with Werkstoffnummer 1.4017 (X6CrNi17-1) has the following composition (in wt. %, remainder Fe):

| C | Si | Mn | P | S | Cr | Ni |
|---|----|----|----|----|----|----|
| ≦0.06 | ≦1 | ≦1 | ≦0.04 | ≦0.015 | 16.0–18.0 | 1.20–1.60 |

Steel alloys for manufacturing the pin according to the invention are steel alloys with at least 0.6 wt. % of carbon and at least 12 wt. % of chromium. It has been found that such pins with a relatively high carbon content used in the present invention are not or hardly subject to corrosion or corrosive wear, which is surprising because a higher carbon content in steel is usually connected with poorer anti-corrosive properties of this steel. This enables conveyor chains built up from modules according to the invention to also be deployed in lubricated conveyor chain systems.

That corrosion or corrosive wear is no problem in the hinge conveyor chains according to the invention is more surprising since the lubricated conveyor chain systems are usually dry when they are not operative (for instance in the weekends), after which, subsequently, when they are put into operation again, they contact the (usually aqueous) lubricating medium. Such an alternation of wet and dry periods under continuous influence of oxygen from the air is generally very corrosive.

Preferably, the steel of the pin according to the invention comprises more than 0.7 wt. % of carbon. As a rule, a carbon content of maximally 2 wt. % is sufficient. Preferably, the carbon content is 0.8–1.6 wt. %. The steel of the pin according to the invention comprises at least 12 wt. % of chromium, preferably 15–19 wt. % of Cr, more preferably 16–18 wt. %.

Particularly suitable as steel for the pins is steel containing, in addition to Fe, the following elements (in wt. %):

| C | 0.95–1.2 |
|---|----------|
| Cr | 16–18 |
| Mn | ≦1 |
| Mo | ≦0.75 |
| P | ≦0.04 |
| Si | ≦1 |
| S | ≦0.03 |

Such steel is known by the Werkstoffnummer (according to DIN) 1.4125 and is also designated by 440C (AISI), X105CrMo17 (EN), Z100CD17 (AFNOR) and S44004 (UNS).

Other suitable types of steel comprise for instance steel with the Werkstoffnummer 1.4109, 1.4111, 1.4112 and 1.4535.

The pins according to the invention can be manufactured in the known manners, for instance by turning or by taking drawn wire as starting material and cutting it. Preferably, the pins for use in the conveyor chain according to the invention are manufactured from drawn wire, more preferably from cold-drawn wire.

The pins can then be hardened. It has been found that the wear of hardened pins is more than 30% lower than that of unhardened pins. The hardening takes place in a manner known to a skilled person by means of a thermal treatment.

It is not necessary to manufacture the whole pin according to the invention from the above-defined steel. According to the invention, such a steel may also be present as an outer jacket layer on a pin from a different material. Such a layer usually has a thickness of a few tenths of millimeters to a few millimeters, for instance 0.5–1.5 mm, typically approximately 1 mm. A pin with such a jacket layer can be obtained in manners known to a skilled person, for instance by subjecting the pin to a surface treatment.

The pins are introduced into the links in the usual manner, for the purpose of forming the conveyor chain according to the invention.

BRIEF DESCRIPTION OF THE DRAWINGS

The invention will now be further described with reference to an exemplary embodiment shown in a drawing, in which:

FIG. 1 shows a perspective bottom view of a number of successive links of a hinge conveyor chain;

FIG. 2 shows a diagrammatic top plan view of the chain of FIG. 1;

FIG. 3 shows a perspective view of a chain pin from the chain of FIGS. 1 and 2.

The Figures are only diagrammatic representations of a preferred embodiment of the invention and are given by way of non-limiting exemplary embodiment. In the Figures, same or corresponding parts are designated by the same reference numerals.

DETAILED DESCRIPTION OF PREFERRED EMBODIMENTS

FIGS. 1 and 2 show a hinge conveyor chain 1 comprising a series of successive links 2 formed from a ferritic-pearlitic stainless steel. The links 2 are, as usual, connected to each other by pins 6 to form an endless chain. In the embodiment described herein, the chain pins 6 are manufactured from a steel alloy with Werkstoffnummer 1.4125, so that the material of the chain pin is substantially non-seizing to the ferritic-pearlitic stainless steel of the link.

The links 2 each comprise a substantially plate-shaped top plate 3 which forms a conveying surface. Near a front side 4, the top plate 3 is provided with two spaced apart link ends 5A, 5B curled up to hinge loops defining coaxial openings for receiving the chain pin 6. Near a back side 5, the top plate 3 is provided with a link end 5C curled up to a hinge loop defining an opening for receiving the chain pin 6, whose position corresponds to the free interspace between the link ends 5A, 5B on the front side 4 of the adjacent link 2. The link ends 5A, 5B and 5C of successive links are hingedly coupled by means of the stainless-steel chain pins 6 reaching though the hinge loops, i.e. received in the aligned openings of the interdigitated link ends of adjacent links 2 and engaging the ferritic-pearlitic stainless steel.

FIG. 3 shows a perspective view of a chain pin 6. The chain pin 6 comprises a substantially cylindrical, steel body 7 whose end faces 8 are, along their circumferential edges 9, substantially smoothly connected to a radially outwardly facing surface 10.

In this example, the chain pin 6 has a diameter of less than 1 cm, preferably approximately 5–8 mm, in particular 6.35 mm. The chain pin has a length of approximately 20–150 mm, depending on the width of the chain and the number of link ends to be coupled.

Successive links 2 can, each time, pivot relative to each other about an axis located in or along the conveying surface and extending substantially transverse to the conveying direction indicated by arrow P. Thus, the chain 1 can be guided around a chain wheel. Further, in this exemplary embodiment, the chain pin 6 is included in the middle link end 5C with play, while the chain pin 6 is clamped in the link ends 5A, 5B. This allows successive links 2 to, each time, pivot relative to each other about an axis extending substantially transverse to the conveying surface, so that the chain 1 can be guided along a bend in a flat surface.

The invention is not limited to the embodiment shown here. For instance, successive links 2 may comprise link ends and top plates having another shape than shown in the drawing. Also, the chain pin may have a varying diameter, for instance when it is stepped or tapered over its length. The chain pin may also be manufactured from another, non-seizing material. In addition, the chain pin may have a body formed from a steel alloy, such as any of the steel alloys disclosed herein, with a layer formed from a different steel alloy having non-seizing properties, such as a steel alloy with Werkstoffnummer 1.41251, defining the chain pin radially outwardly facing surface. Moreover, only the link ends, or portion thereof, could be formed from the ferritic-pearlitic stainless steel, wherein the chain pin engages the ferritic-pearlitic stainless steel portion of the link ends without departing from the scope of the invention.

Such variations will be clear to a skilled person and are understood to be within the scope of the invention as set forth in the appended claims.

EXAMPLES

In the Examples, the types of steel used are designated by their Werkstoffnummer, unless indicated otherwise.

Example 1

Links from 1.4589 steel were coupled to each other by pressing pins (length 41 mm, diameter 6.35 mm) through the link ends of the links in the usual manner. The width of the links was 3.25" (8.26 cm). Different types of steel were used for the pins, as is shown in Table 1.

TABLE 1

Test conditions and results of Example 1

| Pin material | Wear (mm/year) |
| --- | --- |
| *)1.4057 (martensitic) | 0.71 |
| 1.4125 (martensitic) | 0.48 |
| *)1.4310 (austenitic) | 0.62 |
| *)Nitronic 60 (austenitic) | 0.98 |
| *)1.4401 (austenitic) | 0.92 |

*)Comparative example 1.4057: C: 0.14–0.23; Si: ≦1; Mn: ≦1; P: ≦0.045; S: ≦0.030; Cr: 15.5–17.5; Ni: 1.50–2.50.

1.4310: C: ≦0.12; Si ≦1.50; Mn: ≦2; P: ≦0.045; S: ≦0.015; Cr: 16–18; Mo ≦0.80; Ni: 6.00–9.00.

Nitronic 60: C: ≦0.10; Si: 3.5–4.5; Mn: 7.00–9.00; 15; Cr: 16.0–18.0; Mo ≦0.80; Ni: 8.00–9.00; N: 0.08–0.18.

1.4401: C: ≦0.07; Si: ≦1; Mn: ≦2; P: ≦0.045; S: ≦0.030; Cr: 16.5–18.5; Mo: 2.00–2.50; Ni: 10.5–13.5.

The results in Table 1 show that the steel in the hinge conveyor chain according to the invention provides a considerably lower wear.

Example 2

Example 1 was repeated, but this time at a different location.

TABLE 2

Test conditions and results of Example 2

| Pin material | Wear (mm/year) |
| --- | --- |
| *)1.4057 (martensitic) | 0.69 |
| *)1.4462 (duplex) | 0.55 |
| 1.4125 (martensitic) | 0.30 |
| 1.4125 (martensitic)[1)] | 0.19 |
| *)Nitronic 60 (austenitic) | 1.00 |

*)Comparative example 1.4462: C: ≦0.02; Si ≦1.00; Mn: ≦2.00; P: ≦0.030; S: ≦0.020; Cr: 21–23; Mo: 2.5–3.5; Ni: 4.50–6.50; N: 0.08–0.20.

[1)]Thermally hardened

The results in Table 2 shows that, according to the invention, considerably less wear is obtained. Thermal hardening improves the results even more.

Example 3

Example 1 was repeated, but this time pins with a length of 56 mm were used (diameter is 6.35 mm).

TABLE 3

Test conditions and results of Example 3

| Pin material | Wear (mm/year) |
|---|---|
| *)1.4057 (martensitic) | 1.45 |
| 1.4125 (martensitic) | 0.17 |
| *)Nitronic 60 (austenitic) | 1.21 |
| *)1.4462 | 2.12 |

*)Comparative example

The results in Table 3 show that, according to the invention, considerably less wear is obtained.

We claim:

1. A chain pin for a hinge conveyor chain having links including a ferritic-pearlitic stainless steel, said chain pin comprising:
    a substantially cylindrical body having an outwardly facing surface, at least a portion of said outwardly facing surface being formed from a stainless steel alloy more than 0.6 wt. % of carbon and more than 12 wt. % of Cr wherein said outwardly facing surface is substantially non-seizing to the ferritic-pearlitic stainless steel of the link by virtue of composition.

2. The chain pin according to claim 1, wherein said ferritic-pearlitic stainless steel is selected from a group consisting of steel having a Werkstoffnummer (material number) of 1.4589, 1.4016 and 1.4017.

3. The chain pin according to claim 1, wherein said outwardly facing surface of said chain pin comprises a steel alloy with the following composition (in wt. %):

| | |
|---|---|
| C | 0.95–1.2 |
| Cr | 16–18 |
| Mn | $\leq 1$ |
| Mo | $\leq 0.75$ |
| P | $\leq 0.04$ |
| Si | $\leq 1$ |
| S | $\leq 0.03$ |

4. The chain pin according to claim 1, wherein said outwardly facing surface comprises a steel alloy with 15–19 wt. % of Cr.

5. The chain pin to claim 1, wherein said steel alloy is present as an outer layer on said pin, preferably with a layer thickness of 0.5–1.5 mm.

\* \* \* \* \*